United States Patent
Eibl et al.

[15] 3,694,473
[45] Sept. 26, 1972

[54] HIGHER ALKANO YL-PROPANEDIOL-(1,3)-2-TRIMETHYLAMMONIUM-ETHYL PHOSPHATES

[72] Inventors: Hansjorg E. Eibl, Gabelsberger-Strasse 4; Otto Westphal, In der Rothe 14, both of Freiburg, Breisgau, Germany

[22] Filed: July 2, 1971

[21] Appl. No.: 159,524

[30] Foreign Application Priority Data

July 6, 1970    Germany..........P 20 33 359.9

[52] U.S. Cl..................................260/403, 424/211
[51] Int. Cl.................................................A23j 7/00
[58] Field of Search.......................................260/403

[56] References Cited

UNITED STATES PATENTS 3,542,820    11/1970    Rakhit.......................260/403

OTHER PUBLICATIONS

" Chemical Abstracts" Vol. 73 (1970) Por, 109, 239t.

Primary Examiner—Elbert L. Roberts
Attorney—Hammond E. Littell

[57] ABSTRACT

Compounds of the formula

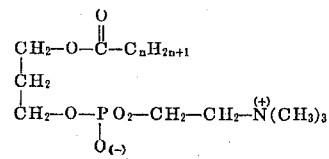

wherein $n$ is an integer from 16 to 25, inclusive; the compounds are useful as immunologic adjuvants.

5 Claims, No Drawings

HIGHER ALKANOYL-PROPANEDIOL-(1,3)-2'-TRIMETHYLAMMONIUM-ETHYL PHOSPHATES

This invention relates to novel higher alkanoyl-propanediol-(1,3)-2'-trimethylammonium-ethyl phosphates, as well as to a method of preparing these compounds.

More particularly, the present invention relates to a novel class of higher alkanoyl-propanediol-(1,3)-2'-trimethylammonium-ethyl phosphates of the formula

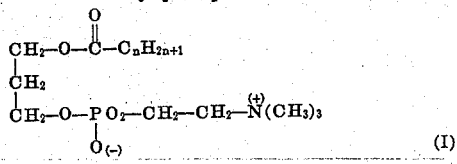
(I)

wherein $n$ is an integer from 16 to 25, inclusive.

A compound of the formula I is prepared by reacting 1,3-propanediol with a higher alkanoyl halide of the formula

(II)

wherein n has the same meanings as in Formula I and Hal is halogen, to form a monoester of the formula

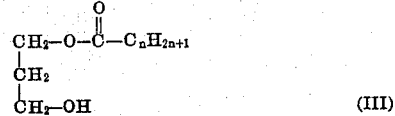
(III)

wherein $n$ has the meanings defined above, reacting said monoester with phosphoric acid mono-($\beta$-bromoethyl)-ester dichloride to form a higher alkanoyl-propanediol-(1,3)-phosphoric acid $\beta$-bromoethyl ester of the formula

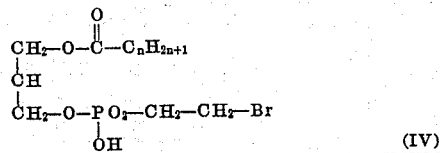
(IV)

wherein $n$ has the meanings defined above, aminating the ester of the Formula IV with trimethylamine, and removing the bromide ions from the amination product to form the internal salt of the Formula I.

The compounds defined by Formula I above are loose amorphous powders exhibiting no sharply defined, characteristic melting point behavior; therefore, their characterization is established by way of thin-layer chromatography ($R_f$-value) and elemental analysis.

The following examples further illustrate the present invention and will enable others skilled in the art to understand it more completely. It should be understood, however, that the invention is not limited solely to the particular examples given below.

EXAMPLE 1

Stearoyl-propanediol-(1,3)-2'-trimethylammonium-ethyl phosphate monohydrate a. 1,3-Propanediol monostearate A solution of 18 millimols of stearoyl chloride in 20 ml of absolute chloroform was added dropwise to a mixture consisting of 66 millimols of 1,3-propanediol, 5 ml of pyridine and 5 ml of chloroform at 0°C. (ice bath), accompanied by stirring, and the reaction mixture was stirred for 30 minutes more on the ice bath. Thereafter, the ice bath was removed and stirring was continued for 12 hours at room temperature. Subsequently, the reaction solution was concentrated by evaporation in vacuo on a water bath at 40° to 50°C., and the oily residue was poured into 800 ml of 0.2 N sulfuric acid on an ice bath. The white precipitate formed thereby was collected by vacuum filtration, washed thoroughly with water, dried in vacuo over blue silicagel, and recrystallized from petroleum ether (40° to 60°C.). The raw product thus obtained was purified by chromatography or silicagel and recrystallization from petroleum ether, yielding pure 1,3-propanediol monostearate.

b. Stearoyl-propanediol-(1,3)-phosphoric acid monocholine ester

Forty-five millimols of anhydrous triethylamine and 18.5 millimols of $\beta$-bromoethyl-phosphoric acid dichloride were added to 15 ml of absolute chloroform at 0°C. (ice bath) and, while stirring the mixture on the ice bath, a solution of 6.5 millimols of 1,3-propanediol monostearate in 15 ml of absolute chloroform was added dropwise thereto. The resulting reaction mixture was then allowed to stand at room temperature for 6 hours and at 40°C. for 12 hours. Subsequently, the dark-colored solution was cooled to 0°C., and then 15 ml of 0.1 N potassium chloride were added to hydrolyze the phosphoric acid chlorides. Thereafter, the reaction mixture was stirred for one hour, 25 ml of methanol were added, the pH was adjusted to about 3 with concentrated hydrochloric acid, and the acidic mixture was thoroughly shaken. The organic phase was evaporated, and the residue was dried over phosphorus pentoxide in a high vacuum.

A mixture consisting of the phosphorylation product thus obtained, 50 ml of butanol and 10 ml of trimethylamine was heated for 12 hours at 55°C., the mixture was then cooled to 0°C., and the crystalline precipitate formed thereby was collected by vacuum filtration and washed with acetone, with water and again with acetone. For further purification, the product was stirred for 30 minutes with a solution of 1 gm of silver acetate in aqueous 90 percent methanol, then chromatographed on silicagel and finally recrystallized from butanone, yielding 50 percent of theory (based on 1,3-propanediol monostearate) of the internal salt of the formula

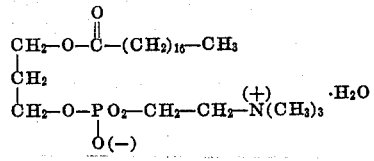

having an $R_f$-value of 0.10 in chloroform/methanol/water (65:30:4).

Analysis: (Monohydrate) $C_{26}H_{56}NO_7P$; mol. wt. 525.7

Calculated: C—59.3%; H—10.72%; N—2.66%; P—5.90%

Found: C—58.2%; H—10.63%; N—2.49%; P—5.93%

EXAMPLE 2

Using a procedure analogous to that described in Example 1, arachidoyl-propanediol-(1,3)-2'-trimethylammoniumethyl phosphate monohydrate of the formula

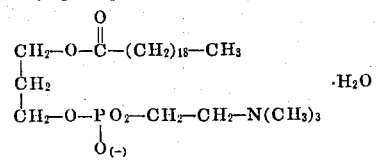

was prepared from 1,3-propanediol monoarachidate, β-bromoethyl-phosphoric acid dichloride and trimethylamine. The product has an $R_f$-value of 0.15.
Analysis: $C_{28}H_{60}NO_7P$; mol. wt. 553.8
Calculated: C—60.8%; H—10.92%; N—2.53%; P—5.60%
Found: C—59.3%; H—11.05%; N—2.40%; P—5.58%

EXAMPLE 3

Using a procedure analogous to that described in Example 1, behenoyl-propanediol-(1,3)-2'-trimethylammoniumethyl phosphate monohydrate of the formula

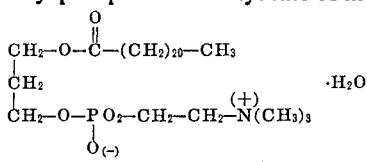

was prepared from 1,3-propanediol monobehenate, β-bromoethyl-phosphoric acid dichloride and trimethylamine. The product had an $R_f$-value of 0.20.
Analysis: $C_{30}H_{64}NO_7P$; mol. wt. 581.8
Calculated: C—61.1%; H—11.09%; N—2.40%; P—5.33%
Found: C—60.5%; H—10.82%; N—2.36%; P—5.34%

EXAMPLE 4

Using a procedure analogous to that described in Example 1, cerotoyl-propanediol-(1,3)-2'-trimethylammoniumethyl phosphate monohydrate of the formula

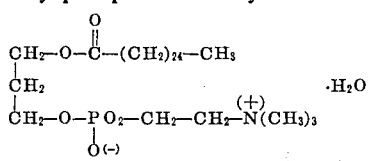

was prepared from 1,3-propanediol monocerotate, β-bromo-ethyl-phosphoric acid dichloride and trimethylamine. The product has an $R_f$-value of 0.25.
Analysis: $C_{34}H_{72}NO_7P$; mol. wt. 637.8
Calculated: C—64.0%; H—11.38%; N—2.20%; P—4.86%
Found: C—62.6%; H—11.49%; N—2.41%; P—4.69%

The compounds of the present invention have useful pharmacological properties. More particularly, they exhibit interfacial activities and, upon peroral or parenteral administration, lead to an alteration of the interfacial activity of cell membranes in the animal organism. While higher concentrations produce cytolytic phenomena, such as hemolysis, a dosage-dependent alteration of the membrane interfacial activity is observed at sublytic dosage levels. Thus, the compounds of the instant invention are useful as immunologic adjuvants in warm-blooded animals, such as mice.

In immunology, adjuvants are understood to be substances which, when mixed with an antigen, enhance antigenicity and increase the immune response of the organism to an antigenic stimulus, i.e., the formation of antibodies. With the aid of adjuvants it is, for instance, possible to counteract the so-called immunoparalysis, that is, to initiate the formation of antibodies even with those antigens which are otherwise tolerated by the organism.

The immunologic adjuvant activity of the compounds of the present invention was ascertained as follows:

1. The test was carried out in analogy to the method of Dresser [Immunology 9 (1965) 261]. The basic principle of this test procedure consists in the inducement of tolerance by means of a soluble protein. This test procedure determines the ability of substances to increase the immune response in the organism against the extremely weak immunogenic bovine gammaglobulin (BGG) to the degree that antibodies for this protein may be clearly proven. For this purpose, mice are administered a 5 mgm dose of centrifuged, aggregate-free BGG by intraperitoneal injection. Normally, with this dose no antibodies are detectable after 8 to 10 days, which means that the animals are not immunized, and under these conditions they are incapable of an immune response to BGG. However, administration of BGG in combination with an immunologic adjuvant prevents the temporary development of tolerance, and the animals then form antibodies against BGG which they normally tolerate. Some 10 to 12 days following initial administration of the tolerific protein, BGG labeled with iodine-125 is again injected. If the animals are tolerant, the labeled antigen is slowly broken down similar to endogenous gammaglobulin. On the other hand, if the animals are immune, a so-called immune elimination takes place, i.e., the labeled antigen is removed from the circulation at a much more rapid rate. Thus, the speed of elimination of iodine-125-labeled BGG is a measured of antibodies formation.

In tests with the compounds of the instant invention it was found that animals treated with labeled BGG and a compound of the Formula I eliminated the tracer protein from the circulation about 10 to 100 times faster than saline-treated controls.

2. Another immunologic test method for antibodies by which immunologic adjuvant properties can be determined is based on the principle that the immunogen (BGG) is coupled with erythrocytes, and the thus treated cells are incubated for 20 hours at 4°C. with serum in a geometric series of dilution. If the serum contains antibodies, the erythrocyte agglutinates. The highest concentration at which this phenomenon can still be observed is known as the antibody-titer of the serum.

This considerably less accurate method, however, also clearly proved that the compounds of this invention are highly active immunologic adjuvants.

For pharmaceutical purposes the compounds of the Formula I are administered to warm-blooded animals perorally or parenterally, but preferably by intraperitoneal injection, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective immunologic adjuvant dosage unit of the compound of the instant invention is from 0.01 to 5 mgm/kg body weight, depending upon the degree of potentiation of immune response desired.

The following examples illustrate a few dosage unit compositions comprising the compound of the Formula I as an active ingredient and represent the best modes contemplated of putting the invention into practical use. The parts are parts by weight unless otherwise specified.

EXAMPLE 5

Coated Pills
The pill core composition is compounded from the following ingredients:

| | |
|---|---|
| Stearoyl-propanediol-(1,3)-phosphoric acid monocholine ester (Example 1) | 100.0 parts |
| Secondary calcium phosphate, anhydrous | 73.0 " |
| Corn starch | 55.0 " |
| Polyvinylpyrrolidone | 5.0 " |
| Carboxymethyl cellulose | 5.0 " |
| Magnesium stearate | 2.0 " |
| Total | 240.0 parts |

Preparation

The monocholine phosphate is intimately admixed with the calcium phosphate and the corn starch, the resulting mixture is moistened with an ethanolic 10 percent solution of the polyvinylpyrrolidone, the moist mass is forced through a 1.5 mm-mesh screen, the resulting granulate is dried at 45°C. and again through the screen, the dry granulate is uniformly admixed with the carboxymethyl cellulose and the magnesium stearate, and the finished composition is compressed into 240 mgm-pill cores which are subsequently coated with a thin shell consisting essentially of a mixture of talcum and sugar and polished with beeswax. Each coated pill contains 100 mgm of the monocholine phosphate and is an oral dosage unit composition with effective immunologic adjuvant action.

EXAMPLE 6

Tablets
The tablet composition is compounded from the following ingredients:

| | |
|---|---|
| Arachidoyl-propanediol-(1,3)-phosphoric acid monocholine ester monohydrate (Example 2) | 200.0 parts |
| Lactose | 100.0 " |
| Corn starch | 80.0 " |
| Polyvinylpyrrolidone | 12.0 " |
| Cellulose, microcrystalline | 54.0 " |
| Magnesium stearate | 4.0 " |
| Total | 450.0 parts |

Preparation

The monocholine phosphate is intimately admixed with the lactose, the corn starch and the polyvinylpyrrolidone, the mixture is moistened with water; the moist mass is forced through a 1.5 mm-mesh screen, dried at 45°C. and again passed through the screen; the resulting dry granulate is uniformly admixed with the cellulose and the magnesium stearate, and the finished composition is compressed into 450 mgm-tablets. Each tablet contains 200 mgm of the monocholine phosphate and is an oral dosage unit composition with effective immunologic adjuvant action.

EXAMPLE 7

Drop Solution
The solution is compounded from the following ingredients:

| | | |
|---|---|---|
| Behenoyl-propanediol-(1,3)-phosphoric acid monocholine ester (Example 3) | | 1.0 parts |
| Methyl p-hydroxybenzoate | | 0.035 " |
| Propyl p-hydroxybenzoate | | 0.015 " |
| Propyleneglycol | | 45.0 " |
| Oil of anise | | 0.05 " |
| Menthol | | 0.05 " |
| Saccharin sodium | | 1.0 " |
| Ethanol | | 1.0 " |
| Distilled water | q.s.ad | 100.0 " by vol. |

Preparation

The propyleneglycol is admixed with 45 parts of distilled water, and the monocholine phosphate is dissolved in the mixture (solution A). The o-hydroxybenzoates, the menthol and the oil of anise are dissolved in the ethanol (solution B). Solutions A and B are admixed, the saccharin sodium is added, and the resulting solution is diluted with distilled water to the indicated volume and filtered. 1 ml of the filtrate (about 20 drops) contains 10 mgm of the monocholine phosphate and is an oral dosage unit composition with effective immunologic adjuvant action.

EXAMPLE 8

Hypodermic Solution
The solution is compounded from the following ingredients:

| | | |
|---|---|---|
| Cerotoyl-propanediol-(1,3)-phosphoric acid-monocholine ester monohydrate | | 50.0 parts |
| Polypropyleneglycol | | 2500.0 " |
| Tartaric acid | | 15.0 " |
| Distilled water | q.s.ad | 5000.0 " by vol. |

Preparation

Two thousand parts of distilled water are heated to about 50°C., and then the indicated amount of polypropyleneglycol is added thereto; thereafter, the monocholine phosphate and the tartaric acid are dissolved therein, and the resulting solution is diluted with additional distilled water to the indicated volume. The finished solution is filtered until free from suspended particles, and the filtrate is filled into 5 ml-ampules which are then sealed and sterilized. Each ampule contains 50 mgm of the monocholine phosphate, and the contents thereof are an intraperitoneally injectable dosage unit composition with effective immunologic adjuvant action.

Analogous results were obtained when any one of the other compounds embraced by formula I was substituted for the particular monocholine ester in Examples 5 through 8. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

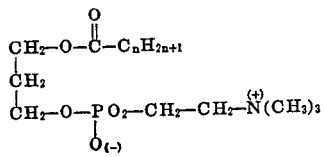

wherein $n$ is an integer from 16 to 25, inclusive.

2. A compound according to claim 1, which is stearoyl-propanediol-(1,3)-2'-trimethylammonium-ethyl phosphate.

3. A compound according to claim 1, which is arachidoyl-propanediol,1,3)-2'-trimethylammonium-ethyl phosphate.

4. A compound according to claim 1, which is behenoyl-propanediol-(1,3)-2'-trimethylammonium-ethyl phosphate.

5. A compound according to claim 1, which is cerotoyl-propanediol-(1,3)-2'-trimethylammonium-ethyl phosphate.

UNITED STATES PATENT OFFICE
CERTIFICATE OF CORRECTION

Patent No. 3,694,473      Dated September 26, 1972

Inventor(s) HANSJORG E. EIBL and OTTO WESTPHAL

It is certified that error appears in the above-identified patent and that said Letters Patent are hereby corrected as shown below:

Insert   --[73] Assignee: Boehringer Ingelheim GmbH
                          Ingelheim/Rhein, Germany    --

Col. 5, line 26 - insert --passed-- after "again".

Col. 6, line 20 - correct "o-hydrox-" to read --p-hydrox- --.

Signed and sealed this 29th day of May 1973.

(SEAL)
Attest:

EDWARD M. FLETCHER, JR.           ROBERT GOTTSCHALK
Attesting Officer                 Commissioner of Patents